Patented July 12, 1932

1,867,014

UNITED STATES PATENT OFFICE

WALTER E. LAWSON, OF WILMINGTON, DELAWARE, ASSIGNOR TO E. I. DU PONT DE NEMOURS & COMPANY, OF WILMINGTON, DELAWARE, A CORPORATION OF DELAWARE

PROCESS OF POLYMERIZING VINYL DERIVATIVES

No Drawing.  Application filed September 22, 1928. Serial No. 307,774.

This invention relates to the art of polymerization, and more particularly to a new process of polymerizing vinyl derivatives.

Various methods have hitherto been developed for the polymerization of vinyl derivatives but, so far as I am aware, all such prior processes involving the use of heat have been difficult to control, especially on account of the exothermic nature of the reaction, and it has therefore been difficult to avoid the darkening of the polymerized derivatives.

I have found that by the use of the continuous flow process disclosed herein it is possible to control the reaction within close limits, thus preventing the darkening of the polymerized derivative, overcoming solubility difficulties with the reactants, preventing damage to the catalyst, and permitting the carrying out of the entire operation as a liquid phase process, in which mixed esters can be produced if desired, and in which higher yields are obtained.

It is therefore an object of this invention to provide a new process of polymerizing vinyl derivatives.

It is another object of this invention to provide a continuous flow process of polymerizing vinyl derivatives.

It is a further object of this invention to provide a process of polymerizing vinyl derivatives which will avoid darkening them.

It is also an object of this invention to provide a process of polymerizing vinyl derivatives containing mixed esters.

With the above and other objects in view, which will be apparent as the description proceeds, I have set forth my invention in the following specification and have included the following examples by way of illustration and not as a limitation.

In the following examples a solution of the vinyl ester or esters containing the desired amount of catalyst is forced from a storage cylinder through a reaction tube by means of a gas, such as nitrogen, under pressure, or by any other suitable means, such as a force pump. The products leaving the reaction tube pass through a cooling coil and are drawn off through a carefully regulated needle valve, the rate of flow through the reaction tube being regulated by the rate of drawoff through this valve.

Example 1

A mixture of sixty parts by weight of ethyl acetate, thirty parts by weight of vinyl chloride, and ten parts by weight of vinyl acetate containing three per cent of benzoyl peroxide, based on the combined vinyl ester content, was forced through a lead-lined steel reaction tube, having a volume of 800 cc., at a pressure of 200 pounds per sq. in., maintaining a temperature of 120° C. and a rate of flow of 800 cc. per hour. The interpolymerized product obtained in this manner gave a slightly yellow solution which yielded a white polymer when precipitated with alcohol. The average yield of polymer was 66%, the concentration of vinyl chloride in the polymer being 72%.

Example 2

A solution of 1000 g. of vinyl chloride, 250 g. vinyl acetate, and 57 g. benzoyl peroxide in 650 g. ethyl acetate (65% vinyl ester concentration) was forced through a lead-lined reaction tube, having a volume of 110 cc., under a pressure of 500 pounds at a rate of approximately 300 cc. per hour. The average temperature was 118° C. The product had a light yellow color and was quite viscous. The yield of polymer ranged from 64 to 72%, the concentration of vinyl chloride in the polymer being 80 per cent.

Example 3

A 45 per cent solution of vinyl benzene (styrene) in ethyl benzene, to which had been added three per cent of benzoyl peroxide, based on the styrene content, was forced through a lead-lined tube, having a volume of 110 cc., under a pressure of 200 pounds, and at a rate of 200 cc. per hour. The average temperature was 117° C. Approximately 65 per cent of the styrene was polymerized.

Example 4

A 45 per cent solution of styrene in ethyl benzene was subjected to ozone treatment from an ozonizer for a period of 5 hours.

The solution was forced through a lead-lined tube under conditions similar to those detailed in Example 3 above. Approximately the same percentage of meta styrene was obtained as in the preceding example.

Although the above examples are limited to the production of vinyl benzene, and mixtures of vinyl chloride and vinyl acetate, it will be obvious that other vinyl derivatives, such as vinyl acetate, vinyl chloroacetate, and vinyl naphthalene, may be produced in a similar manner.

Likewise, instead of benzoyl peroxide and ozone other catalysts may be used, such as sodium bisulfite. The apparatus is also useful for the polymerizing of compounds which polymerize in the presence of heat in the absence of a catalyst.

Also, I am not limited to the use of ethyl acetate and ethyl benzene as other solvents, such as chlorobenzene, acetone and toluene, may be used.

In the above examples I have indicated the preferred temperature range as being from 117 to 120° C., but I do not desire to be limited to these temperatures inasmuch as temperatures above 80° C. are suitable, the time of heating being controlled by the rate of draw-off through the needle valve, and being continued until the desired degree of conversion is obtained. In general I have found that when using tubes of smaller diameter I may run at rates greater than the volume of the tube per hour.

It will therefore be apparent that I have developed a new and useful continuous flow process of polymerizing vinyl derivatives which permits the obtaining of higher yields of polymer; permits a definite control of the temperature of the reaction, which is difficult to control in batch processes, with a resulting likelihood of spoiling the usefulness of the resulting polymer, as by unduly darkening it; permits greater safety in operation; permits the use of highly desirable catalysts, such as benzoyl peroxide, which are unstable and whose catalytic activity would therefore be impaired at higher temperatures; and permits lower equipment and operating costs.

The continuous flow process disclosed herein also permits the maintenance of a high concentration of the unpolymerized ester in the liquid phase, which has been found to be particularly desirable when polymerizing vinyl chloride in a mixture with other vinyl compounds. Vinyl chloride is apparently only slightly soluble in organic solvents at 90-120° C. and, since polymerization takes place only in the liquid phase, it is necessary to maintain the concentration of the vinyl chloride in the solution by employing excess pressure.

When polymerizing two vinyl derivatives in mutual contact I have found that the resulting polymers are different from mixtures of the two esters polymerized separately, and the process set forth herein also permits a close control over the ratios of the two vinyl derivatives since there is no free space for the escape of one of the reactants.

Although the reaction tube is indicated in the above examples as being tin lined or lead lined steel tubing, it will be apparent that other types of reaction tubes may be used, and that the heating may be conducted electrically or in any other well known manner, and the various parts of the apparatus can be connected in any suitable manner, as for instance with high pressure steel tubing.

As many apparently widely different embodiments of this invention may be made without departing from the spirit and scope thereof, it is to be understood that I do not limit myself to the specific embodiments thereof except as defined in the appended claims.

I claim:

1. A process of polymerizing a polymerizable vinyl compound which comprises continuously forcing a solution of a vinyl ester and a catalyst through a reaction tube heated to the reaction temperature of the solution.

2. A process of polymerizing vinyl derivatives which comprises continuously forcing a solution of a vinyl ester and a catalyst through a reaction tube heated to the reaction temperature of the solution and in which the products leaving the reaction tube are passed through a cooling coil.

3. The process of claim 1 in which the products leaving the reaction tube are cooled and in which the rate of flow through the reaction tube is controlled by the rate of drawing off.

4. The process of claim 1 in which the catalyst is benzoyl peroxide.

5. The process of claim 1 in which solvent is chlorobenzene and the catalyst comprises 3% of benzoyl peroxide based on the vinyl ester content, and this is forced through the reaction tube under 200 pounds pressure at a temperature of 118° C.

6. The process of claim 2 in which the catalyst is benzoyl peroxide.

7. The process of claim 2 in which the solvent is chlorobenzene and the catalyst comprises 3% of benzoyl peroxide based on the vinyl ester content, and this is forced through the reaction tube under 200 pounds pressure at a temperature of 118° C.

8. The process of claim 1 in which the vinyl ester in a mixture of vinyl chloride and vinyl acetate.

9. The process of claim 1 in which the vinyl ester is a mixture of vinyl chloride and vinyl acetate and the catalyst is benzoyl peroxide.

10. The process of claim 1 in which the vinyl ester is a 65% solution of a mixture of vinyl chloride and vinyl acetate in chlorobenzene, and the catalyst comprises 3% of benzoyl peroxide based on the vinyl ester content, and this is forced through the reaction tube under 500 pounds pressure at a temperature of 120° C.

11. The process of claim 2 in which the vinyl ester is a mixture of vinyl chloride and vinyl acetate.

12. The process of claim 2 in which the vinyl ester is a mixture of vinyl chloride and vinyl acetate and the catalyst is benzoyl peroxide.

13. The process of claim 2 in which the vinyl ester is a 65% solution of a mixture of vinyl chloride and vinyl acetate in chlorobenzene, and the catalyst comprises 3% of benzoyl peroxide based on the vinyl ester content, and this is forced through the reaction tube under 500 pounds pressure at a temperature of 120° C.

14. A method of polymerizing a polymerizable vinyl compound which comprises passing a solution containing one of a group of substances which consists of vinyl esters and styrene through a reaction tube heated to the reaction temperature.

In testimony whereof, I affix my signature.

WALTER E. LAWSON.